(12) United States Patent
Arai et al.

(10) Patent No.: US 7,087,185 B2
(45) Date of Patent: *Aug. 8, 2006

(54) MAGNETIC POWDER AND ISOTROPIC BONDED MAGNET

(75) Inventors: Akira Arai, Shimosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 395 days.

This patent is subject to a terminal disclaimer.

(21) Appl. No.: 10/385,061

(22) Filed: Mar. 10, 2003

(65) Prior Publication Data

US 2003/0213534 A1 Nov. 20, 2003

Related U.S. Application Data

(62) Division of application No. 09/620,703, filed on Jul. 20, 2000, now Pat. No. 6,558,482.

(30) Foreign Application Priority Data

Jul. 22, 1999 (JP) ................................. 11-207910

(51) Int. Cl.
*H01F 1/57* (2006.01)

(52) U.S. Cl. .................................... 252/62.54; 148/302

(58) Field of Classification Search ................ 148/302; 252/62.54, 62.55
See application file for complete search history.

(56) References Cited

U.S. PATENT DOCUMENTS

| | | | |
|---|---|---|---|
| 4,975,213 A * | 12/1990 | Sakai et al. | 252/62.53 |
| 5,449,417 A * | 9/1995 | Shimizu et al. | 148/302 |
| 5,750,044 A * | 5/1998 | Yoneyama et al. | 252/62.54 |
| 5,872,501 A | 2/1999 | Hamano et al. | |
| 5,888,417 A * | 3/1999 | Akioka et al. | 252/62.55 |
| 6,019,859 A * | 2/2000 | Kanekiyo et al. | 148/302 |

(Continued)

FOREIGN PATENT DOCUMENTS

EP 0 195 219 A2 9/1986

(Continued)

OTHER PUBLICATIONS

U.S. Appl. No. 09/590,820, filed Jun. 9, 2000, Arai.

(Continued)

*Primary Examiner*—John P. Sheehan
(74) *Attorney, Agent, or Firm*—Harness, Dickey & Pierce, P.L.C.

(57) ABSTRACT

Disclosed herein is a magnetic powder which can provide a magnet having a high magnetic flux density and excellent magnetizability and reliability especially excellent heat resisting property (heat stability). The magnetic powder is composed of an alloy composition represented by $R_x(Fe_{1-y}Co_y)_{100-x-z-w}B_zAl_w$ (where R is at least one kind of rare-earth element, x is 8.1–9.4 at %, y is 0–0.30, z is 4.6–6.8 at %, and w is 0.02–1.5 at %), the magnetic powder being constituted from a composite structure having a soft magnetic phase and a hard magnetic phase, wherein the magnetic powder has characteristics in which, when the magnetic powder is formed into an isotropic bonded magnet by mixing with a binding resin and then molding it, the irreversible susceptibility ($\chi_{irr}$) which is measured by using an intersectioning point of a demagnetization curve in the J-H diagram representing the magnetic characteristics at the room temperature and a straight line which passes the origin in the J-H diagram and has a gradient (J/H) of $-3.8\times10^{-6}$ H/m as a starting point is less than $5.0\times10^{-7}$ H/m, and the intrinsic coercive force ($H_{CJ}$) of the magnet at the room temperature is in the range of 406–717 kA/m.

5 Claims, 11 Drawing Sheets

No.1: Demagnetization Curve
No.2: Straight Line
  Having Gradient (J/H) of $-3.8 \times 10^{-6}$ H/m
No.3: Tangential Line at Point "P"
No.4: Recoil Curve
No.5: Straight Line
  Showing Gradient of the Recoil Curve

U.S. PATENT DOCUMENTS

| | | | |
|---|---|---|---|
| 6,171,410 B1 | 1/2001 | Kojima et al. | 148/302 |
| 6,187,217 B1 | 2/2001 | Arai et al. | |
| 6,338,761 B1 * | 1/2002 | Kanekiyo et al. | 148/122 |
| 6,500,277 B1 | 12/2002 | Arai et al. | 148/302 |
| 6,527,875 B1 | 3/2003 | Arai et al. | 148/302 |
| 6,551,418 B1 | 4/2003 | Arai et al. | 148/302 |
| 6,558,482 B1 | 5/2003 | Arai et al. | 148/302 |

FOREIGN PATENT DOCUMENTS

| | | |
|---|---|---|
| EP | 0 657 899 A1 | 6/1995 |
| EP | 1 017 066 A2 | 7/2000 |
| JP | 58-136739 | 8/1983 |
| JP | 63-213324 | 9/1988 |
| JP | 01-205403 | 8/1989 |
| JP | 4-75302 | 3/1992 |
| JP | 05-261494 | 10/1993 |
| JP | 06-045167 | 2/1994 |
| JP | 7-54106 | 2/1995 |
| JP | 08-045719 | 2/1996 |
| JP | 08-281383 | 10/1996 |
| JP | 10-177911 | 6/1998 |
| JP | 10-241923 | 9/1998 |
| JP | 10-261515 | 9/1998 |
| JP | 10259459 | 9/1998 |
| JP | 10-265915 | 10/1998 |
| JP | 10-317110 | 12/1998 |
| JP | 11-273920 | 10/1999 |
| JP | 11-288807 | 10/1999 |
| JP | 2001-035712 | 2/2001 |

OTHER PUBLICATIONS

Chang, Wu, Ma, Bounds and Yao, "Magnetic Properties Enhancement of $\alpha$-Fe/$Nd_2FE_{14}B$-type Nanocomposites by Co Substitution," Journal of Applied Physics, vol. 83, No. 4, Feb. 15, 1998, pp. 2147-2151.

D. Goll, M. Seeger, H. Kronmuller, "Magnetic and Microstructural Properties of Nanocystalline Exchange Coupled PrFeB Permanent Magnets," Journal of Magnetism and Magnetic Materials, Sep. 16, 1997, pp. 49-60.

Grieb et al., "Influence of Al-Based Additions on the Coercivity and Microstructure in FE-Nd-B Magnets," Journal of Magnetism and Magnetic Materials, 80 (1989), pp. 75-79.

Goll, D. et al, Journal of Magnetism and Magnetic Materials, "Magnetic and Microstructural Properties of Nanocrystalline Exchange Coupled PrFeB Permanent Magnets", 185 (1998) pp. 49-60. **.

Chang, W.C. et al, "Magnetic Properties Enhancement of Alpha-Fe/Nd2Fe14B-Type Nanocomposites by Co Substitution", Journal of Applied Physics, American Institute of Physics, New York, vol. 83, No. 4, Feb. 15, 1998, pp. 2147-2151. **.

Grieb, Th, Henig, Martinek, Stadelmaier and Petzow, "Phase Relations and Magnetic Properties of New Phases in the Fe-No-Al and Fe-No-C Systems and Their Influence on Magnets," 8108 IEEE Transactions on Magnetics Sep. 26, 1990, No. 5, New York, US, pp. 1367-1369.

Shinichi Hayashida, Yasuhisa Kanai, Hirotoshi Fukunaga (Nagasaki Univ.), Fumitoshi Yamashita (Matsushita Electric Ind. Co., ltd.), "Flux stability in Nd-Fe-B-based exchange-coupled spring magnets", pp. 19-24.

* cited by examiner

No.1: Demagnetization Curve
No.2: Straight Line
Having Gradient (J/H) of $-3.8 \times 10^{-6}$ H/m
No.3: Tangential Line at Point "P"
No.4: Recoil Curve
No.5: Straight Line
Showing Gradient of the Recoil Curve

FIG. 8
TABLE 1

| Content of Al (w) | Br (T) | Hcj (kA/m) | (BH)max (kJ/m³) | χirr (×10⁻⁷H/m) | Irreversible Flux Loss (%) | Magnetized Magnetic Field at the Magnetizing Ratio of 90% (MA/m) |
|---|---|---|---|---|---|---|
| 0 (Comp.Ex.) | 0.84 | 334 | 74.2 | 5.9 | -6.4 | — |
| 0.05 | 0.91 | 494 | 112.3 | 4.3 | -4.5 | 0.71 |
| 0.2 | 0.89 | 501 | 109.6 | 4.0 | -4.1 | 0.74 |
| 0.7 | 0.88 | 512 | 104.5 | 3.4 | -3.5 | 0.75 |
| 1.3 | 0.85 | 414 | 94.7 | 4.6 | -4.8 | 0.65 |
| 2.0 (Comp.Ex.) | 0.79 | 315 | 71.1 | 6.3 | -6.7 | 0.63 |

FIG. 9
TABLE 2

| Substituted Amount of Pr (y) | Br (T) | H$_{cJ}$ (kA/m) | (BH) max (kJ/m$^3$) | $\chi_{irr}$ (×10$^{-7}$H/m) | Irreversible Flux Loss (%) | Magnetized Magnetic Field at the Magnetizing Ratio of 90% (MA/m) |
|---|---|---|---|---|---|---|
| 0 | 0.88 | 520 | 110.0 | 3.5 | −3.6 | 0.75 |
| 0.1 | 0.88 | 526 | 112.6 | 3.4 | −3.5 | 0.76 |
| 0.2 | 0.89 | 540 | 114.9 | 3.2 | −3.3 | 0.78 |
| 0.4 | 0.89 | 559 | 118.5 | 3.5 | −3.6 | 0.82 |
| 0.6 | 0.86 | 570 | 105.2 | 4.0 | −4.1 | 0.84 |
| 0.8 | 0.83 | 550 | 96.1 | 4.7 | −4.8 | 0.79 |

FIG. 10

TABLE 3

| Substituted Amount of Dy (1−z) | Br (T) | Hcj (kA/m) | (BH)max (kJ/m³) | χirr (×10⁻⁷H/m) | Irreversible Flux Loss (%) | Magnetized Magnetic Field at the Magnetizing Ratio of 90% (MA/m) |
|---|---|---|---|---|---|---|
| 0.01 | 0.88 | 548 | 109.1 | 3.6 | −3.6 | 0.76 |
| 0.04 | 0.87 | 575 | 108.2 | 3.5 | −3.4 | 0.78 |
| 0.06 | 0.86 | 592 | 106.6 | 3.4 | −3.3 | 0.81 |
| 0.08 | 0.85 | 611 | 105.6 | 3.1 | −3.0 | 0.83 |
| 0.10 | 0.83 | 623 | 102.8 | 3.2 | −3.1 | 0.86 |
| 0.15 | 0.78 | 608 | 93.2 | 4.5 | −4.5 | 0.93 |

FIG. 11

TABLE 4

| Content of Si (v) | Br (T) | $H_{cJ}$ (kA/m) | (BH)max (kJ/m³) | $\chi_{irr}$ (×10⁻⁷H/m) | Irreversible Flux Loss (%) | Magnetized Magnetic Field at the Magnetizing Ratio of 90% (MA/m) | Corrosion Resistance of Magnetic Powders | Corrosion Resistance of Bonded Magnets |
|---|---|---|---|---|---|---|---|---|
| 0 | 0.85 | 575 | 106.2 | 3.5 | −3.7 | 0.79 | B | B |
| 0.1 | 0.86 | 581 | 110.3 | 3.4 | −3.5 | 0.81 | B | A |
| 0.3 | 0.88 | 597 | 119.5 | 3.3 | −3.3 | 0.84 | A | A |
| 0.8 | 0.86 | 609 | 115.2 | 3.0 | −3.1 | 0.90 | A | A |
| 2.0 | 0.84 | 623 | 107.8 | 2.5 | −2.8 | 0.92 | A | A |
| 3.0 | 0.81 | 635 | 100.4 | 2.3 | −2.5 | 0.95 | A | A |

MAGNETIC POWDER AND ISOTROPIC BONDED MAGNET

This is a division of application Ser. No. 09/620,703, filed Jul. 20, 2000, now Pat. No. 6,558,482.

BACKGROUND OF THE INVENTION

1. Field of the Invention

The present invention relates to magnetic powder and an isotropic bonded magnet produced using the magnetic powder.

2. Description of the Prior Art

For reduction in size of motors, it is desirable that a magnet has a high magnetic flux density (with the actual permeance) when it is used in the motor. Factors for determining the magnetic flux density of a bonded magnet include magnetic performance (that is, magnetization) of the magnetic powder and the content (that is, compositional ratio) of the magnetic powder contained in the bonded magnet. Accordingly, when the magnetic performance (magnetization) of the magnetic powder itself is not sufficiently high, a desired magnetic flux density cannot be obtained unless the content of the magnetic powder in the bonded magnet is raised to an extremely high level.

At present, most of practically used high performance rare-earth bonded magnets use the isotropic bonded magnets which are made using MQP-B powder manufactured by MQI Corp. as the rare-earth magnetic powder thereof. The isotropic bonded magnets are superior to the anisotropic bonded magnets in the following respect; namely, in the manufacture of the bonded magnet, the manufacturing process can be simplified because no magnetic field orientation is required, and as a result, the rise in the manufacturing cost can be restrained. On the other hand, however, the conventional isotropic bonded magnets represented by those manufactured using MQP-B powder have the following disadvantages.

The conventional isotropic bonded magnets do not have sufficiently high magnetic flux density. Because of the low magnetic performance (that is, the insufficient magnetization) of the magnetic powder used, the content of the magnetic powder to be contained in the bonded magnet has to be increased. However, the increase in the content of the magnetic powder leads to the deterioration in the moldability of the bonded magnet, so there is a certain limit in this attempt. Moreover, even if the content of the magnetic powder is somehow managed to be increased by changing the molding conditions or the like, there still exists a limit to the obtainable magnetic flux density. For these reasons, it is not possible to reduce the size of the motor by using the conventional isotropic bonded magnets.

Since the conventional bonded magnet has high coercivity (coercive force), magnetizability thereof is poor, thus requiring a relatively high magnetic field for magnetization.

Although there are reports concerning nanocomposite magnets having high remanent magnetic flux densities, their coercive forces, on the contrary, are so small that the magnetic flux densities (for the permeance in the actual use) obtainable for the practical motors are very low. Further, these magnets have poor heat stability due to their small coercive forces.

The conventional bonded magnets have low corrosion resistance property and heat resisting property. Namely, in these magnets, it is necessary to increase the content of the magnetic powder to be contained in the bonded magnet in order to compensate the low magnetic performance of the magnetic powder. This means that the density of the bonded magnet becomes extremely high. As a result, the corrosion resistance and heat resisting property of the bonded magnet are deteriorated, thus leading to low reliability.

SUMMARY OF THE INVENTION

It is therefore an object of the present invention to provide magnetic powder that can produce a magnet having a high magnetic flux density and having excellent magnetizability and reliability especially temperature characteristics (that is, heat resisting property and heat stability), and provide an isotropic bonded magnet formed from the magnetic powder.

In order to achieve the above object, the present invention is directed to magnetic powder composed of an alloy composition represented by $R_x(Fe_{1-y}Co_y)_{100-x-z-w}B_zAl_w$ (where R is at least one kind of rare-earth element, x is 8.1–9.4 at %, y is 0–0.30, z is 4.6–6.8 at %, and w is 0.02–1.5 at %), the magnetic powder being constituted from a composite structure having a soft magnetic phase and a hard magnetic phase, wherein the magnetic powder has characteristics in which, when the magnetic powder is formed into an isotropic bonded magnet by mixing with a binding resin and then molding it, the irreversible susceptibility ($\chi_{irr}$) which is measured by using an intersectioning point of a demagnetization curve in the J-H diagram representing the magnetic characteristics at the room temperature and a straight line which passes the origin in the J-H diagram and has a gradient (J/H) of $-3.8 \times 10^{-6}$ H/m as a starting point is less than $5.0 \times 10^{-7}$ H/m, and the intrinsic coercive force ($H_{CJ}$) of the magnet at the room temperature is in the range of 406–717 kA/m.

As described above, according to the present invention, the following effects can be obtained.

Since each of the magnetic powders has the composite structure having a soft magnetic phase and a hard magnetic phase and contains a predetermined amount of Al, they have high magnetizability and exhibit excellent magnetic characteristics so that intrinsic coercive force and rectangularity thereof are especially improved.

The absolute value of the irreversible flux loss is small and excellent beat resisting property (heat stability) can be obtained.

Because of the high magnetic flux density that can be secured by this invention, it is possible to obtain a bonded magnet with high magnetic performance even if it is isotropic. In particular, since magnetic performance equivalent to or better than the conventional isotropic bonded magnet can be obtained with a magnet of smaller volume as compared with the conventional isotropic bonded magnet, it is possible to provide a high performance motor of a smaller size.

Moreover, since a higher magnetic flux density can be secured, in manufacturing a bonded magnet sufficiently high magnetic performance is obtainable without pursuing any means for elevating the density of the bonded magnet. As a result, the dimensional accuracy, mechanical strength, corrosion resistance, heat resisting property (heat stability) and the like can further improved in addition to the improvement in the moldability, so that it is possible to readily manufacture a bonded magnet having high reliability. In particular, when Si is contained therein, further improved corrosion resistance can be obtained.

Since the magnetizability of the magnet according to this invention is excellent, it is possible to magnetize a magnet with a lower magnetizing field. In particular, multipolar magnetization or the like can be accomplished easily and surely, and further a high magnetic flux density can be obtained.

Since a high density is not required to the bonded magnet, the present invention is adapted to the manufacturing method such as the extrusion molding method or the injection molding method by which molding at high density is difficult as compared with the compression molding method, and the effects described in the above can also be realized in the bonded magnet manufactured by these molding methods. Accordingly, various molding method can be selectively used and thereby the degree of selection of shapes for the bonded magnet can be expanded.

In this connection, it is preferred that the composite structure is a nanocomposite structure.

Further, in the present invention, it is preferred that said R comprises rare-earth elements mainly containing Nd and/or Pr. In this case, said R includes Pr and its ratio with respect to the total mass of said R is 5–75%. When the ratio lies in this range, it is possible to improve the coercivity and the rectangularity by hardly causing a drop in the remanent magnetic flux density.

Furthermore, in the present invention, it is also preferred that said R includes Dy and its ratio with respect to the total mass of said R is equal to or less than 14%. When the ratio lies in this range, the coercivity can be improved without causing marked drop in the remanent magnetic flux density, and an improvement of the heat resisting property is also possible.

Moreover, it is preferred that the magnetic powder is obtained by quenching the alloy of a molten state.

It is also preferred that the magnetic powder is obtained by pulverizing a quenched ribbon of the alloy which is manufactured by using a cooling roll.

Further, it is also preferred that the magnetic powder is subjected to a heat treatment for at least once during the manufacturing process or after its manufacture.

Furthermore, it is preferred that the average grain size of the magnetic powder lies in the range of 0.5–150 μm.

The present invention is also directed to an isotropic rare-earth bonded magnet, which is formed by binding the magnetic powder as set forth in the above with a binding resin.

The present invention is also directed to an isotropic rare-earth bonded magnet formed by binding magnetic powder containing Al with a binding resin, wherein the isotropic rare-earth bonded magnet is characterized in that the irreversible susceptibility ($\chi_{irr}$) which is measured by using an intersectioning point of a demagnetization curve in the J-H diagram representing the magnetic characteristics at the room temperature and a straight line which passes the origin in the J-H diagram and has a gradient (J/H) of $-3.8 \times 10^{-6}$ H/m as a starting point is less than $5.0 \times 10^{-7}$ H/m, and the intrinsic coercive force ($H_{CJ}$) of the magnet at the room temperature is in the range of 406–717 kA/m.

In the present invention, it is preferred that said magnetic powder is formed of R-TM-B—Al based alloy (where R is at least one rear-earth element and TM is a transit metal containing Iron as a major component thereof.

Further, it is also preferred that the magnetic powder includes at least one element which is selected from the group comprising Cu, Si, Ga, Ti, V, Ta, Zr, Nb, Mo, Hf, Ag, Zn, P, Ge and Cr.

Furthermore, it is preferred that the content of the element is equal to or less than 3 at %.

Moreover, it is preferred that the magnetic powder is constituted from a composite structure having a soft magnetic phase and a hard magnetic phase.

Moreover, it is also preferred that the isotropic bonded magnet is to be subjected to multipolar magnetization or is already subjected to multipolar magnetization. In this case, it is also preferred that the isotropic bonded magnet is used for a motor.

These and other objects, structures and advantages of the present invention will be apparent from the following detailed description of the invention and the examples taken in conjunction with the appended drawings.

BRIEF DESCRIPTION OF THE DRAWINGS

FIG. 8 is a table showing the evaluation of a first example of the present invention.

FIG. 9 is a table showing the evaluation of a second example of the present invention.

FIG. 10 is a table showing the evaluation of a third example of the present invention.

FIG. 11 is a table showing the evaluation of a fourth example of the present invention

DETAILED DESCRIPTION OF THE INVENTION

Figure 1:
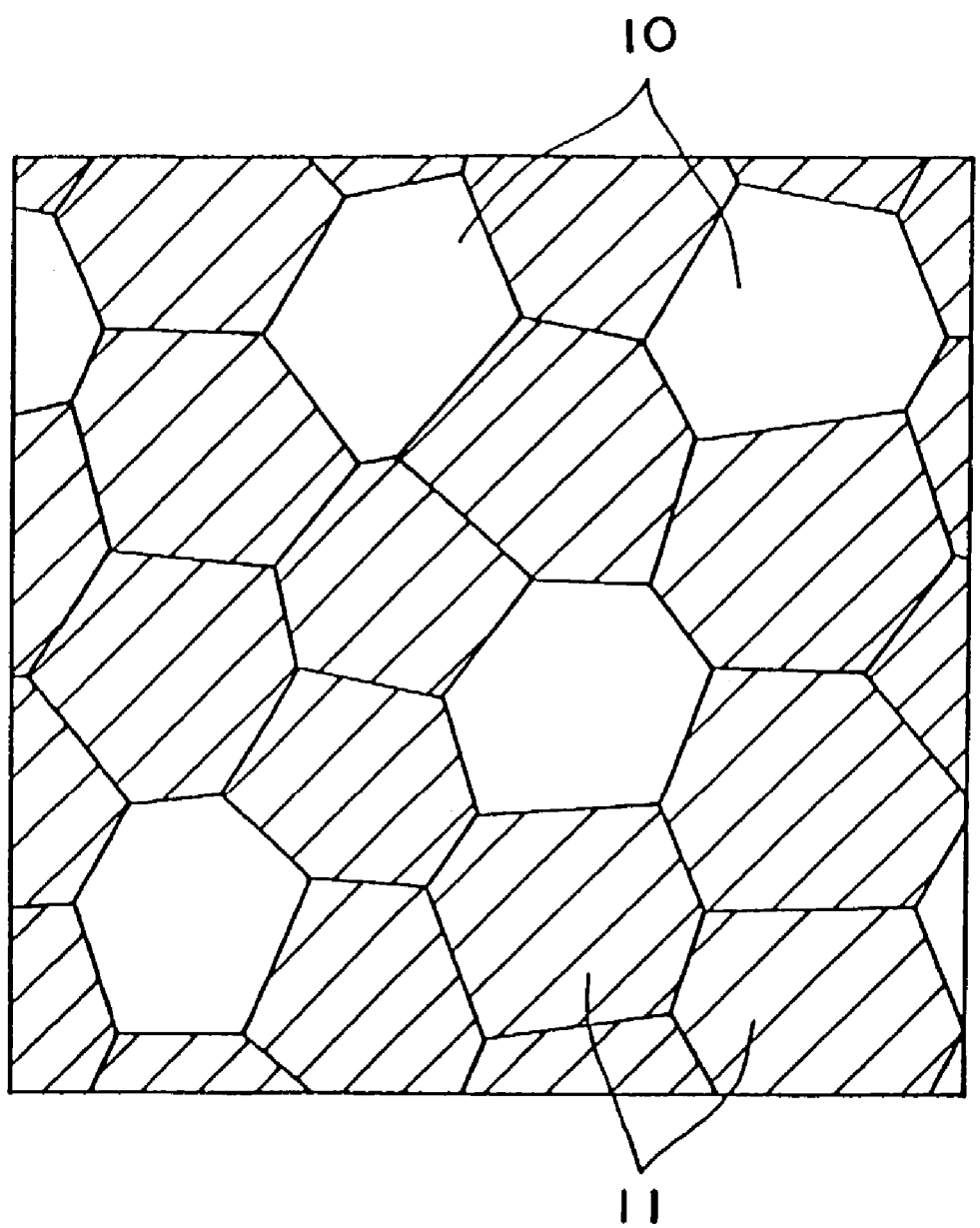
FIG. 1 is an illustration which schematically shows one example of a composite structure (nanocomposite structure) of magnetic powder according to the present invention.

In the following, magnetic powder according to this invention and isotropic rare-earth bonded magnets formed from the magnetic powders will be described in detail.

At present, a magnet having high magnetic flux density is practically required in order to reduce the size of motors or other electrical devices. In a bonded magnet, factors that determine the magnetic flux density are the magnetic performance (magnetization, in particular) of magnetic powder and the content (compositional ratio) of the magnetic powder contained in the bonded magnet. When the magnetic performance (magnetization) of the magnetic powder itself is not so high, a desired magnetic flux density cannot be obtained unless the content of the magnetic powder in the bonded magnet is increased to an extremely high level.

As mentioned in the above, MQP-B powder made by MQI Corp. which is now being widely used can not provide sufficient magnetic flux density depending on its use. As a result, in manufacturing the bonded magnets, it is required to increase the content of the magnetic powder in the bonded magnet, that is, it is required to increase the magnetic flux density. However, this in turn leads to the lack of reliability in the corrosion resistance property, heat resisting property and mechanical strength thereof and the like. Further, there is a problem in that the obtained magnet has a poor magnetizability due to its high coercivity.

In contrast, the magnetic powder and the isotropic bonded magnet (isotropic rear-earth bonded magnet) according to this invention can obtain a sufficient magnetic flux density and an adequate coercive force. As a result, without extremely increasing the content of the magnetic powder in the bonded magnet, it is possible to provide a bonded magnet having a high strength and having excellent moldability, corrosion resistance property and magnetizability. This makes it possible to reduce the size of the bonded magnet and increase its performance, thereby contributing to reduce the size of motors and other devices employing magnets.

Further, the magnetic powder of the present invention may be formed so as to constitute a composite structure having a hard magnetic phase and a soft magnetic phase.

While the MQP-B powder made by MQI Corp. is a single phase structure of a hard magnetic phase, the magnetic powder of the present invention is a nanocomposite structure which also has a soft magnetic phase having a high magnetization. Accordingly, it has an advantage that the total magnetization of the system as a whole is high. Further, the recoil permeability of the bonded magnet becomes high, there is an advantage that, even after a reverse magnetic field is applied, the demagnetizing factor remains small.

The magnetic powder according to this invention has alloy compositions represented by $R_x(Fe_{1-y}Co_y)_{100-x-z-w}B_zAl_w$ (R is at least one kind of rare-earth elements, x is 8.1–9.4 at %, y is 0–0.30, z is 4.6–6.8 at %, and w is 0.02–1.5 at %).

Examples of rare-earth metals R include Y, La, Ce, Pr, Nd, Pm, Sm, Eu, Gd, Tb, Dy, Ho, Er, Tm, Yb, Lu, and a misch metal. In this connection, R may include one kind or two or more kinds of these elements.

The content of R is set at 8.1–9.4 at %. When the content of R is less than 8.1 at %, sufficient coercive force cannot be obtained, and addition of Al enhances the coercive force only to a small extent. On the other hand, when the content of R exceeds 9.4 at %, sufficient magnetic flux density fails to be obtained because of the drop in the magnetization potential.

Here, it is preferable that R includes the rare-earth elements Nd and/or Pr as the principal ingredient. The reason for this is that these rare-earth elements enhance the saturation magnetization of the hard magnetic phase which constitutes the composite structure (especially, nanocomposite structure) the magnetic powder, and are effective in realizing satisfactory coercive force as a magnet.

Moreover, it is preferable that R includes Pr, and its ratio to the totality of R is 5–75%, and more preferably 10–60%. This is because when the ratio lies in this range, it is possible to improve the coercivity and the rectangularity by hardly causing a drop in the remanent magnetic flux density.

Furthermore, it is preferable that R includes Dy and its ratio to the totality of R is equal to or less than 14%. When the ratio lies in this range, the coercivity can be improved without causing marked drop in the remanent magnetic flux density, and the heat resisting property is also improved.

Cobalt (Co) is a transition metal element having properties similar to Fe. By adding Co, that is by substituting a part of Fe by Co, the Curie temperature is elevated and the temperature characteristic of the powder is improved. However, if the substitution ratio of Fe by Co exceeds 0.30, both of the coercive force and the magnetic flux density tend to fall off. The range of 0.05–0.20 of the substitution ratio of Fe by Co is more preferable since in this range not only the temperature characteristic (heat resisting property and heat stability) of the magnetic powder but also the magnetic flux density thereof are improved. In this regard, it is to be noted that a part of Fe or Co may be substituted by Ni.

Boron (B) is an element which is important for obtaining high magnetic characteristics, and its content is set at 4.6–6.8 at %. When the content of B is less than 4.6 at %, the rectangularity of the magnetic power is deteriorated. On the other hand, when the content of B exceeds 6.8 at %, the nonmagnetic phase increase and the magnetic flux density drops sharply.

Aluminum (Al) is an element which is advantageous for improving the coercive force, and the effect of improvement of the coercive force is conspicuous when its content lies in the range of 0.02–1.5 at %. In addition, the rectangularity and the maximum magnetic energy product are improved in this range in accompanying with the improvement in the coercive force, and the corrosion resistance property becomes also satisfactory. In this connection, however, when the content of R is less than 8.1 at %, these effects due to addition of Al are very small as mentioned above. Further, when the content of Al exceeds 1.5 at %, the drop in the magnetization is conspicuous, which makes it difficult to obtain a high magnetic density flux, thereby lowering the coercive force.

Further, another important effect obtained by containing 0.02–1.5 at % of Al is that the irreversible susceptibility ($\chi_{irr}$) described hereinafter can be made small and the irreversible flux loss can be improved so that the heat resisting property (heat stability) of the magnet is improved. In this connection, it is to be noted that if the amount of Al is less than 0.02 at %, such effect is hardly realized and the effect for improving coercive force described above is small.

Of course, Al itself is a known substance. However, in the present invention, it has found through repeatedly conducted experiments and researches that by containing 0.02–1.5 at % of Al to the magnetic powder constituted from a composite structure having a soft magnetic phase and a hard magnetic phase, the following four effects are realized, in particular these four effects are realized at the same time, and this is the significance of the present invention.

(1) The coercive force of the magnetic powder can be improved while maintaining excellent rectangularity and the maximum magnetic energy product.

(2) The irreversible susceptibility ($\chi_{irr}$) described below can be made small.

(3) The irreversible flux loss can be improved, that is the absolute value thereof can be lowered.

(4) Better corrosion resistance property can be maintained.

As described in the above, the feature of this invention can be found in the incorporation of a minute amount or trace amount of Al, and addition of Al in the amount exceeding 1.5 at % gives rather an inverse effect and therefore it is not the intent of this invention.

In this connection, the preferred range of the content of Al is 0.02–1.5 at % as described above. In this case, it is more preferable that the upper limit of the range is 1.2 at % and it is the most preferable that the upper limit is 0.8 at %.

In addition, for the purpose of further improving the magnetic characteristics, at least one other element selected from the group comprising Cu, Si, Ga, Ti, V, Ta, Zr, Nb, Mo, Hf, Ag, Zn, P, Ge and Cr (hereinafter, referred to as "Q") may be contained as needed. When containing the element belonging to Q, it is preferable that the content thereof should be less than 3 at %, and it is more preferable that the content thereof lies in the range of 0.2–3 at %, and it is the most preferable that the content thereof lies in the range of 0.5–2 at %.

The addition of the element belonging to Q makes it possible to exhibit inherent effect of the kind of the element. For example, the addition of Cu, Si, Ga, V, Ta, Zr, Cr or Nb exhibits an effect of improving corrosion resistance property. Among these elements, the addition of Si exhibits the effects (1) to (3) described above in addition to the effect of improving the corrosion resistance property.

As described above, the magnetic material of the present invention has a composite structure having a soft magnetic phase and a hard magnetic phase.

Figure 2:
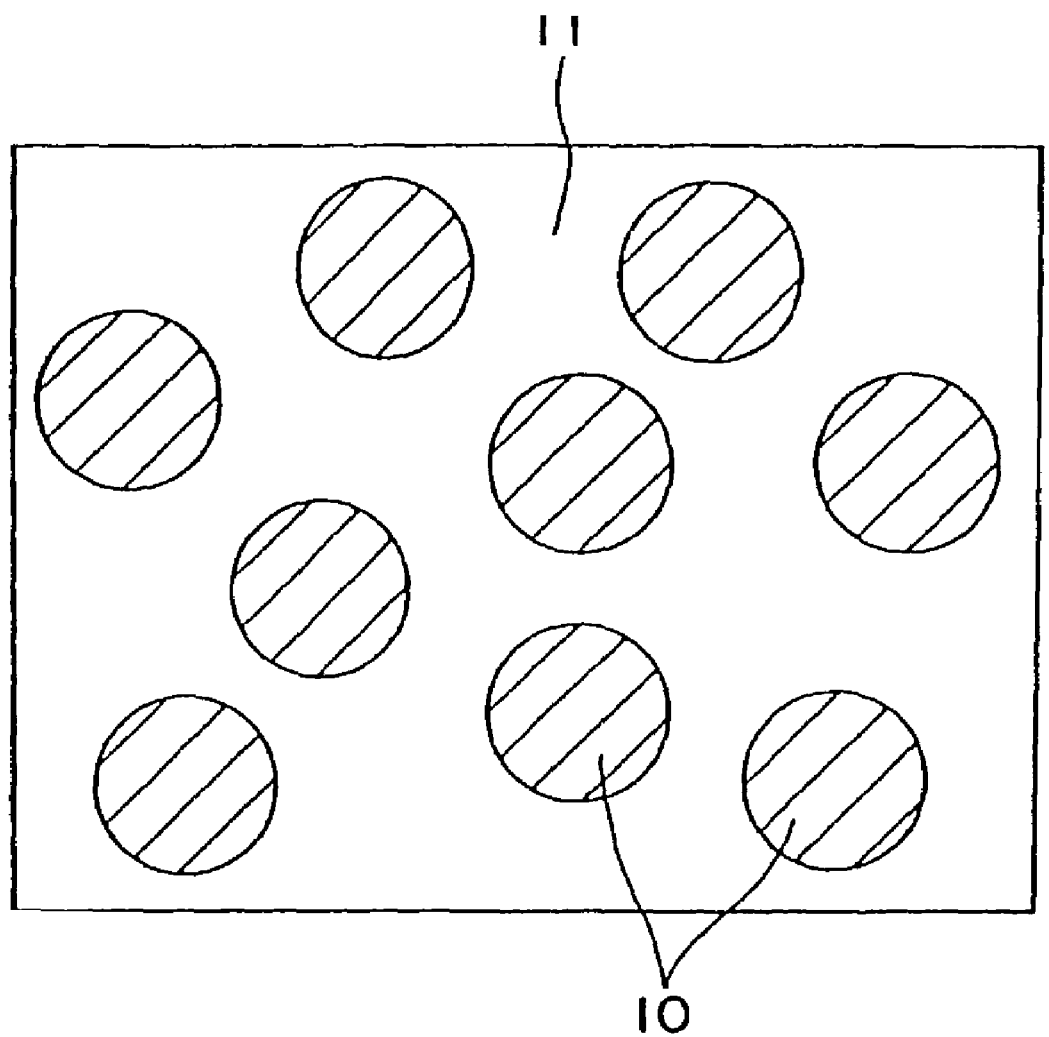
FIG. 2 is an illustration which schematically shows one example of a composite structure (nanocomposite structure) of magnetic powder according to the present invention.
Figure 3:
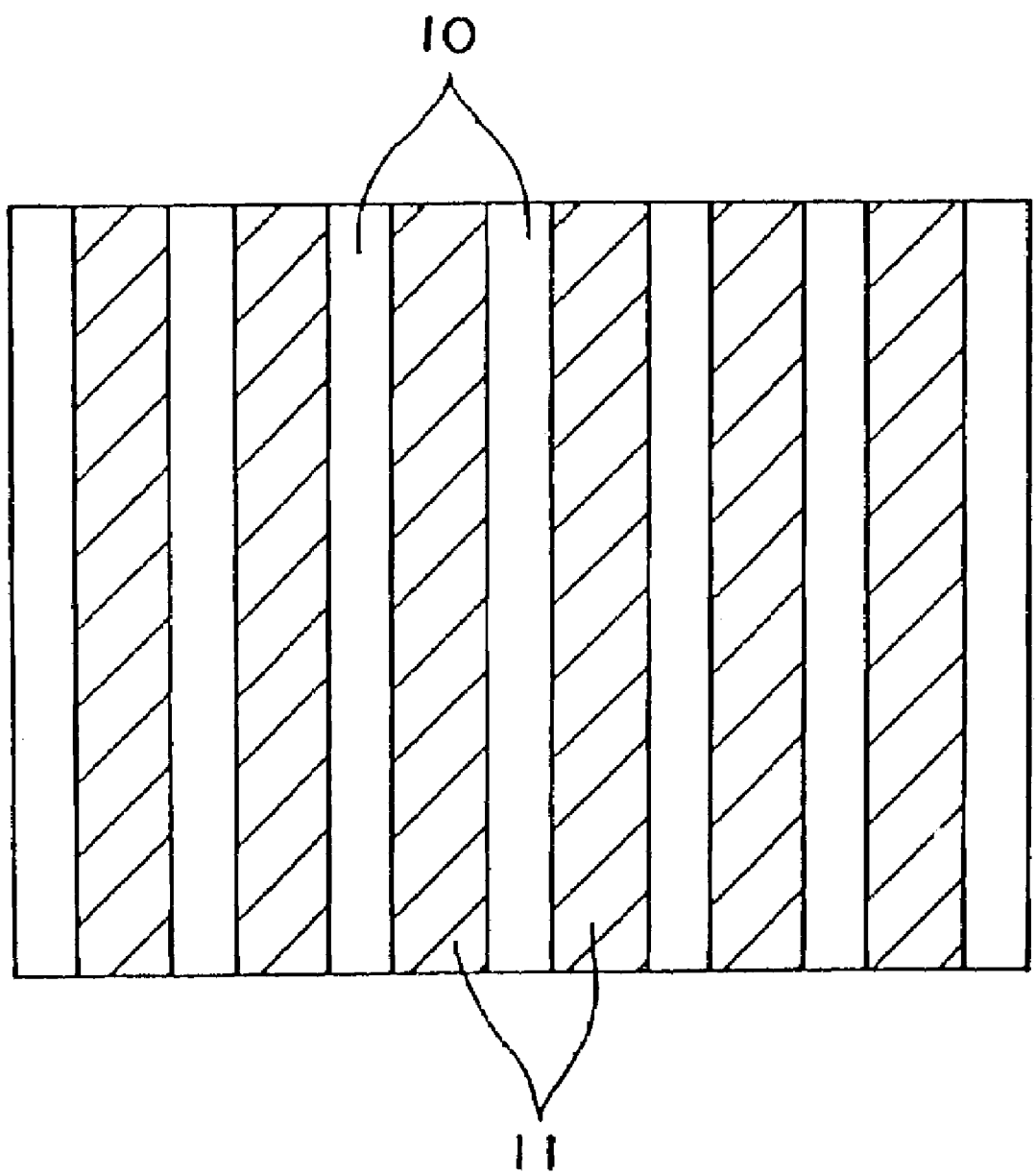
FIG. 3 is an illustration which schematically shows one example of a composite structure (nanocomposite structure) of magnetic powder according to the present invention.

In this composite structure (nanocomposite structure), a soft magnetic phase 10 and a hard magnetic phase 11 exist in a pattern (model) as shown in, for example, FIG. 1, FIG. 2 or FIG. 3, where the thickness or grain diameter of the respective phases is on the order of nanometers (for example, 1–100 nm). Further, the soft magnetic phase 10 and the hard magnetic phase 11 are arranged adjacent to each other (this also includes the case where these phases are adjacent through grain boundary phase), which makes it possible to perform magnetic exchange interaction there between.

In this case, the average grain diameter size is preferably 5 to 50 nm and more preferably 10 to 40 nm. In the case where the average crystal grain size (diameter) is less than the lower limit value, the influence of the magnetic exchange interaction becomes too strong and thereby magnetic inversion is likely to occur, which may result in the case where the coercive force is deteriorated.

On the other hand, when the average crystalline grain size exceeds the upper limit value, the crystalline grain size becomes large while the influence of the magnetic exchange interaction between crystalline grains is weakened, thus leading to the case that the magnetic flux density, coercive force and rectangularity and maximum energy product may be deteriorated.

The patterns illustrated in FIG. 1 to FIG. 3 are only specific examples, and are not limited thereto. For example, the soft magnetic phase 10 and the hard magnetic phase 11 in FIG. 2 are interchanged.

The magnetization of the soft magnetic phase readily changes its orientation by the action of an external magnetic field. Therefore, when it coexists with the hard magnetic phase, the magnetization curve for the entire system shows a stepped "serpentine curve" in the second quadrant of the J-H diagram. However, when the soft magnetic phase has a sufficiently small size of less than several tens of nm, magnetization of the soft magnetic body is sufficiently strongly constrained through the coupling with the magnetization of the surrounding hard magnetic body, so that the entire system exhibits functions like a hard magnetic body.

A magnet having such a composite structure (nanocomposite structure) has mainly the following five features.

(1) In the second quadrant of the J-H diagram (that is, coordinate where the longitudinal axis represents magnetization (J) and the horizontal axis represents magnetic field (H)), the magnetization springs back reversibly (in this sense, such a magnet is also referred to as a "spring magnet").

(2) It has a satisfactory magnetizability, and it can be magnetized with a relatively low magnetic field.

(3) The temperature dependence of the magnetic characteristics are small as compared with the case where the system is constituted from a hard magnetic phase alone.

The changes in the magnetic characteristics with the lapse of time are small.

No deterioration in the magnetic characteristics is observable even if it is finely pulverized.

In the alloy composition described in the above, the hard magnetic phase and the soft magnetic phase are composed of, for example, respectively by the following.

The hard magnetic phase: $R_2TM_{14}B$ system (where, TM is Fe or Fe and Co), or $R_2TM_{14}BAl$ system (or $R_2TM_{14}BQ$ system, or $R_2TM_{14}BAlQ$ system).

The soft magnetic phase: TM ($\alpha$-Fe or $\alpha$-(Fe, Co) in particular), or an alloy of TM and Al (or an alloy of TM and Q or an alloy of TM, Al and Q).

As for the magnetic powders according to this invention, it is preferable that they are manufactured by quenching a molten alloy, and more preferable that they are manufactured by pulverizing a quenched ribbon obtained by quenching and solidifying the molten metal of the alloy. An example of such a method will be described in the following.

Figure 4:
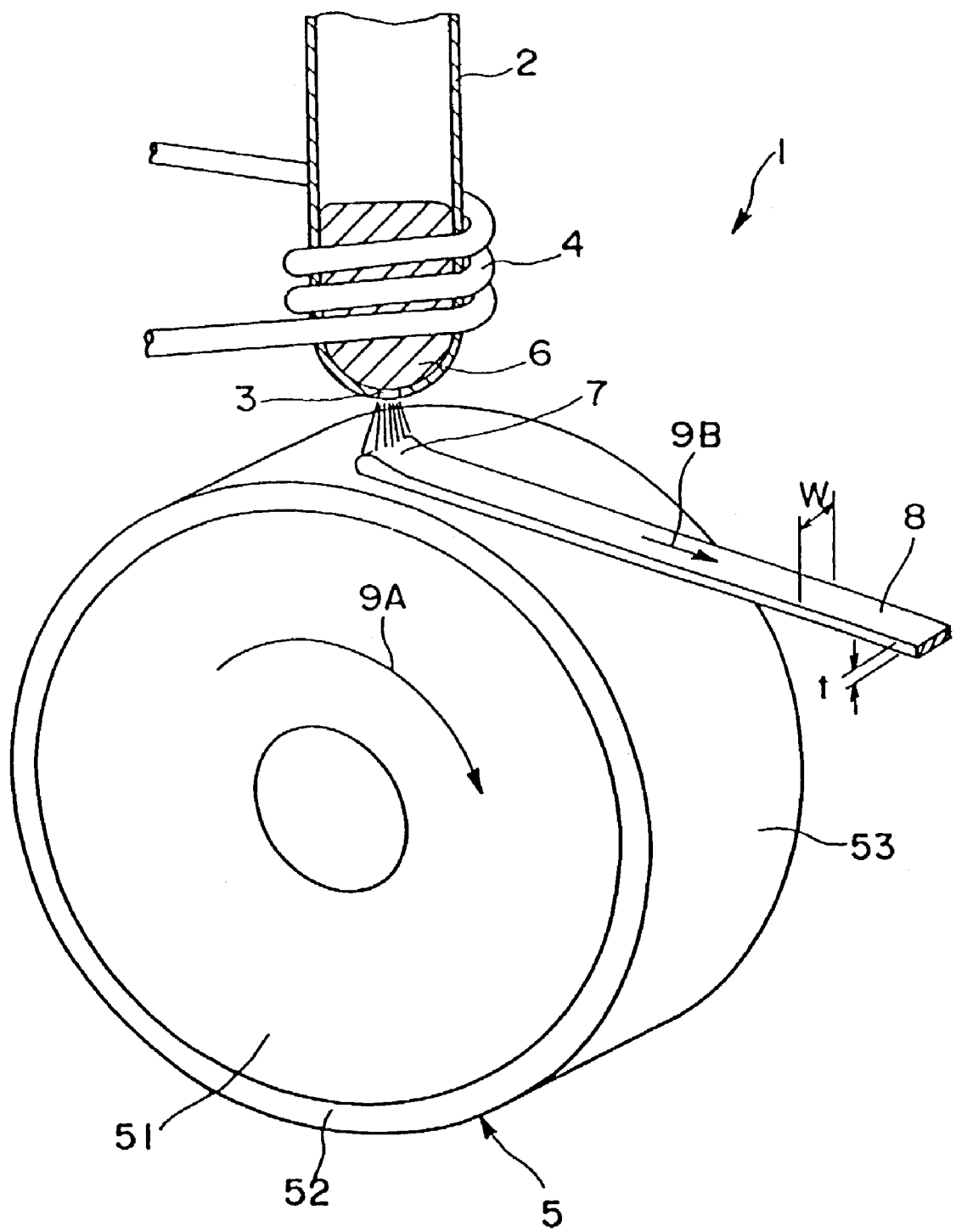
FIG. 4 is a perspective view showing an example of the configuration of an apparatus (quenched ribbon manufacturing apparatus) for manufacturing a magnet material.
Figure 5:
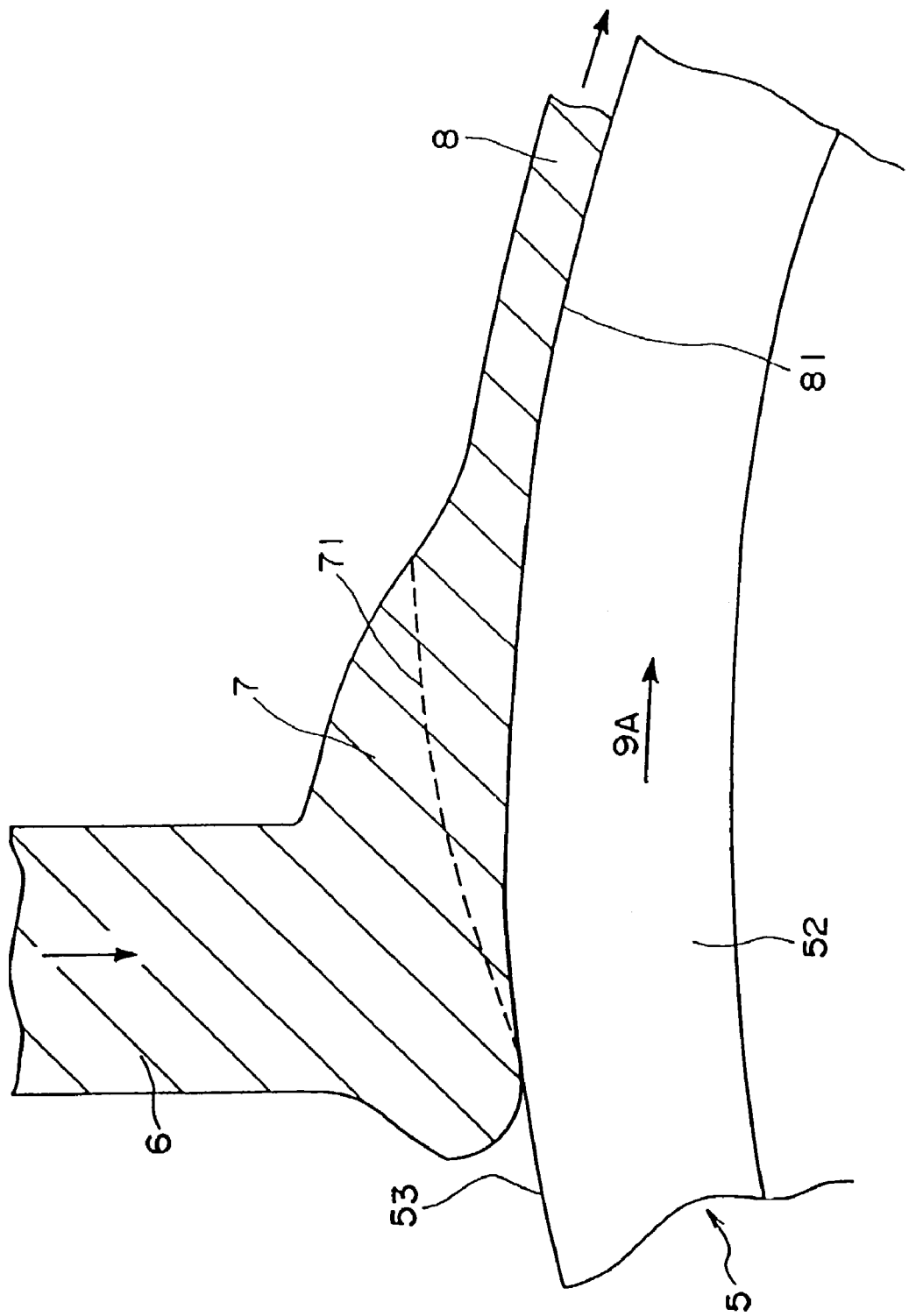
FIG. 5 is a sectional side view showing the situation in the vicinity of colliding section of the molten metal with a cooling roll in the apparatus shown in FIG. 4.

FIG. 4 is a perspective view showing an example of the configuration of an apparatus (quenched ribbon manufacturing apparatus) for manufacturing a magnet material by the quenching method using a single roll, and FIG. 5 is a sectional side view showing the situation in the vicinity of colliding section of the molten metal with a cooling roll in the apparatus shown in FIG. 4.

As shown in FIG. 4, a quenched ribbon manufacturing apparatus 1 is provided with a cylindrical body 2 capable of storing the magnet material, and a cooling roll 5 which rotates in the direction of an arrow 9A in the figure relative to the cylindrical body 2. A nozzle (orifice) 3 which injects the molten metal of the magnet material alloy is formed at the lower end of the cylindrical body 2.

In addition, a heating coil 4 is arranged on the outer periphery of the cylindrical body 2 in the vicinity of the nozzle 3, and the magnet material in the cylindrical body 2 is melted by inductively heating the interior of the cylindrical body 2 through application of, for example, a high frequency wave to the coil 4.

The cooling roll 5 is constructed from a base part 51 and a surface layer 52 which forms a circumferential surface 53 of the cooling roll 5.

The base part 51 may be formed either integrally with the surface layer 52 using the same material, or formed using a material different from that of the surface layer 52.

Although there is no particular limitation on the material of the base part 51, it is preferable that it is a metallic material with high heat conductivity such as copper or a copper alloy in order to be able to dissipate heat of the surface layer 52 as quickly as possible.

Further, it is preferable that the surface layer 52 is constituted of a material with heat conductivity equal to or lower than that of the base part 51.

The quenched ribbon manufacturing apparatus 1 is installed in a chamber (not shown), and is operated preferably under the condition where the interior of the chamber is filled with an inert or other kind of gas. In particular, in order to prevent oxidation of a quenched ribbon 8, it is preferable that the gas is an inert gas such as argon, helium, nitrogen or the like.

In the quenched ribbon manufacturing apparatus 1, the magnet material (alloy) is placed in the cylindrical body 2 and melted by heating with the coil 4, and the molten metal 6 is discharged from the nozzle 3. Then, as shown in FIG. 5, the molten metal 6 collides with the circumferential surface 53 of the cooling roll 5, and after the formation of a puddle 7, the molten metal 6 is cooled down rapidly to be solidified while dragged along the circumferential surface 53 of the rotating cooling roll 5, thereby forming the quenched ribbon 8 continuously or intermittently. Roll surface 81 of the quenched ribbon 8 thus formed is soon released from the circumferential surface 53, and proceeds in the direction of an arrow 9B in FIG. 4. The solidification interface 71 of the molten metal is indicated by a broken line in FIG. 5.

The optimum range of the circumferential velocity of the cooling roll 5 depends upon the composition of the molten alloy, the wettability of the circumferential surface 53 with respect to the molten metal 6, and the like. However, for the enhancement of the magnetic characteristics, a velocity in the range of 1 to 60 m/s is normally preferable, and 5 to 40 m/s is more preferable. If the circumferential velocity of the cooling roll 5 is too small, the thickness t of the quenched ribbon 8 is too large depending upon the volume flow rate (volume of the molten metal discharged per unit time), and the diameter of the crystalline grains tends to increase. On the contrary, if the circumferential velocity is too large, amorphous structure becomes dominant. Further, enhancement of the magnetic characteristics can be expected in neither case even if a heat treatment is given in the later stage.

Thus obtained quenched ribbon 8 may be subjected to a heat treatment for the purpose of, for example, acceleration of recrystallization of the amorphous structure and homogenization of the structure. The conditions of this heat treatment may be, for example, a heating in the range of 400 to 900° C. for 0.5 to 300 min.

Moreover, in order to prevent oxidation, this heat treatment is preferable to be performed in a vacuum or under a reduced pressure (for example, in the range of $1 \times 10-1$ to $1 \times 10-6$ Torr), or in a nonoxidizing atmosphere of an inert gas such as nitrogen, argon, helium or the like.

The quenched ribbon (thin ribbon-like magnet material) 8 obtained as in the above has a microcrystalline structure or a structure in which microcrystals are included in an amorphous structure, and exhibits excellent magnetic characteristics. The magnetic powder of this invention is obtained by pulverizing the quenched ribbon 8.

The pulverizing method of the quenched ribbon is not particularly limited, and various kinds of pulverizing or crushing apparatus such as ball mill, vibration mill, jet mill, and pin mill may be employed. In this case, in order to prevent oxidation, pulverization maybe performed under vacuum or reduced pressure (for example, under a low pressure of $1 \times 10-1$ to $1 \times 10-6$ Torr), or in a nonoxidizing atmosphere of an inert gas such as nitrogen, argon, helium, or the like.

The average grain size of the magnetic powder is not particularly limited. However, for magnetic powder to be used for manufacturing isotropic bonded magnets described later, by considering prevention of oxidation of the magnetic powder and of deterioration in the magnetic characteristics due to pulverization, it is preferable to choose the range of 0.5 to 150 μm, more preferably the range of 1.0 to 65 μm, and still more preferably the range of 5 to 55 μm.

In order to obtain a better moldability of the bonded magnet, it is preferable to give a certain degree of dispersion to the grain size distribution of the magnetic powder. By so doing, it is possible to reduce the porosity of the bonded magnet obtained. As a result, it is possible to raise the density and the mechanical strength of the bonded magnet assuming the same content of the magnetic powder in the bonded magnet, thereby enabling to further improve the magnetic characteristics.

The obtained magnetic powder may be subjected to a heat treatment for the purpose of, for example, removing the influence of stress introduced by the pulverization and controlling the crystalline grain size. The conditions of the heat treatment are, for example, heating at a temperature in the range of 350 to 850° C. for 0.5 to 300 min.

In order to prevent oxidation of the powder, it is preferable to perform the heat treatment in a vacuum or under a reduced pressure (for example, in the range of $1 \times 10-1$ to $1 \times 10-6$ Torr), or in a nonoxidizing atmosphere of an inert gas such as nitrogen, argon, and helium.

When a bonded magnet is manufactured using the magnetic powder described in the above, the obtained magnetic powder has a satisfactory bindability with the binding resin (wettability of the binding resin), so that the bonded magnet has a high mechanical strength and excellent thermal stability (heat resisting property) and corrosion resistance property. Consequently, it can be concluded that the magnetic powder is suitable for the manufacture of the bonded magnet.

In the above, the quenching method is described in terms of the single roll method, but the twin roll method may also be employed. Besides, other methods such as the atomizing method which uses gas atomization, the rotating disk method, the melt extraction method, and the mechanical alloying method (MA) may also be employed. Since such a quenching method can refine the metallic structure (crystalline grains), it is effective for enhancing the magnet characteristics, especially the coercivity or the like, of the bonded magnet.

Next, the isotropic rare-earth bonded magnets (hereinafter, referred to simply also as "bonded magnets") according to this invention will be described.

The bonded magnets of this invention is formed by binding the above described magnetic powder using a binding resin.

As for the binder, either of a thermoplastic resin or a thermosetting resin may be employed.

As the thermoplastic resin, for example, a polyamid (example: nylon 6, nylon 46, nylon 66, nylon 610, nylon 612, nylon 11, nylon 12, nylon 6-12, nylon 6-66, nylon 6T and nylon 9T); a thermoplastic polyimide; a liquid crystal polymer such as an aromatic polyester; a poly phenylene oxide; a poly phenylene sulfide; a polyolefin such as a polyethylene, a polypropylene and an ethylene-vinyl acetate copolymer; a modified polyolefin; a polycarbonate; a poly methyl methacrylate; a polyester such as a poly ethylen terephthalate and a poly butylene terephthalate; a polyether; a polyether ether ketone; a polyetherimide; a polyacetal, or the like; and a copolymer, a blended body, and a polymer alloy having these as main ingredients, or the like, may be mentioned, where one kind or a mixture of two or more kinds of these may be employed.

Among these resins, a resin containing a polyamide as its main ingredient is particularly preferred from the viewpoint of especially excellent moldability and high mechanical strength. Further, a resin containing a liquid crystal polymer and/or a poly phenylene sulfide as its main ingredient is also preferred from the viewpoint of enhancing the heat resisting property. These thermoplastic resins also have an excellent kneadability with the magnetic powder.

These thermoplastic resins provide an advantage in that a wide range of selection can be made. For example, it is possible to provide a thermoplastic resin having a good moldability or to provide a thermoplastic resin having good heat resisting property and mechanical strength by appropriately selecting their kinds, copolymerization or the like.

On the other hand, as the thermosetting resin, various kinds of epoxy resins of bisphenol type, novolak type, and naphthalene-based, a phenolic resin, a urea resin, a melamine resin, a polyester (or an unsaturated polyester) resin, a polyimide resin, a silicone resin, a polyurethane resin, or the like, for example, may be mentioned, and one kind or a mixture of two or more kinds of these may be employed.

Among these resins, an epoxy resin, a phenolic resin, a polyimide resin, or a silicone resin is preferable from the viewpoint of their special excellence in the moldability, high mechanical strength, and high heat resisting property, and an epoxy resin is especially preferable. These thermosetting resins also have an excellent kneadability with the magnetic powder and homogeneity in kneading.

The unhardened thermosetting resin to be used may be either in liquid state or in solid (powdery) state at room temperature.

A bonded magnet according to this invention described in the above may be manufactured, for example, as in the following. First, a bonded magnet composite (compound) which contains the magnetic powder, a binder resin, and an additive (antioxidant, lubricant, or the like) as needed, is prepared. Then, the prepared compound is formed into a desired magnet form in a space free from magnetic field by a molding method such as compression molding (press molding), extrusion molding, or injection molding. When the binding resin used is a thermosetting type, the obtained green compact is hardened by heating or the like after molding.

In the three kinds of molding method, the extrusion molding and the injection molding (in particular, the injection molding) have advantages in that the latitude of shape selection is broad, the productivity is high, and the like. However, these molding methods require to ensure a sufficiently high fluidity of the compound in the molding machine in order to obtain satisfactory moldability. For this reason, in these methods it is not possible to increase the content of the magnetic powder, namely, to make the bonded magnet having high density, as compared with the case of the compression molding method. In this invention, however, it is possible to obtain a high magnetic flux density as will be described later, so that excellent magnetic characteristics can be obtained even without making the bonded magnet high density. This advantage of the present invention can also be extended even in the case where bonded magnets are manufactured by the extrusion molding method or the injection molding method.

The content of the magnetic powder in the bonded magnet is not particularly limited, and it is normally determined by considering the compatibility of the molding method and moldability, and high magnetic characteristics. More specifically, it is preferable to be in the range of 75–99 wt %, and more preferably in the range of 85–97.5 wt %.

In particular, for a bonded magnet to be manufactured by the compression molding method, the content of the magnetic powder is preferable to be in the range of 90–99 wt %, and more preferably in the range of 93–98.5 wt %.

For a bonded magnet to be manufactured by the extrusion molding or the injection molding, the content of the magnetic powder is preferable to be in the range of 75–98 wt %, and more preferably in the range of 85–97 wt %.

The density $\rho$ of the bonded magnet is determined by factors such as the specific gravity of the magnetic powder contained in the magnet and the content of the magnetic powder, and porosity of the bonded magnet and the like. In the bonded magnets according to this invention, the density $\rho$ is not particularly limited, but it is preferable to be in the range of 5.3–6.6 g/cm3, and more preferably in the range of 5.5–6.4 g/cm3.

In this invention, since the magnetic flux density and the coercive force of the magnetic powder are high and the magnetic powder has a relatively larger coercive force, the molded bonded magnet provides excellent magnetic characteristics (especially, high maximum magnetic energy product) even when the content of the magnetic powder is relatively low. In this regard, it goes without saying that it is possible to obtain the excellent magnetic characteristics in the case where the content of the magnetic powder is high.

The shape, dimensions, and the like of the bonded magnet manufactured according to this invention are not particularly limited. For example, as to the shape, all shapes such as columnar, prism-like, cylindrical (ring-shaped), circular, plate-like, curved plate-like, and the like are acceptable. As to the dimensions, all sizes starting from large-sized one to ultraminiaturized one are acceptable. However, as repeatedly described in this specification, the present invention is particularly advantageous in miniaturization and ultraminiaturization of the bonded magnet.

The bonded magnet of this invention as described in the above has magnetic characteristics in which the irreversible susceptibility ($\chi$irr) which is measured by using an intersectioning point of a demagnetization curve in the J-H diagram (that is, coordinate where the longitudinal axis represents magnetization (J) and the horizontal axis represents magnetic field (H)) representing the magnetic characteristics at the room temperature and a straight line which passes the origin in the J-H diagram and has a gradient (J/H) of $-3.8 \times 10^{-6}$ H/m as a starting point is less than $5.0 \times 10^{-7}$ H/m, and the intrinsic coercive force (HCJ) of the magnet at the room temperature is in the range of 406–717 kA/m. Hereinafter, explanation will be made with regard to the irreversible susceptibility ($\chi$irr) and the intrinsic coercive force (HCJ).

Figure 6:
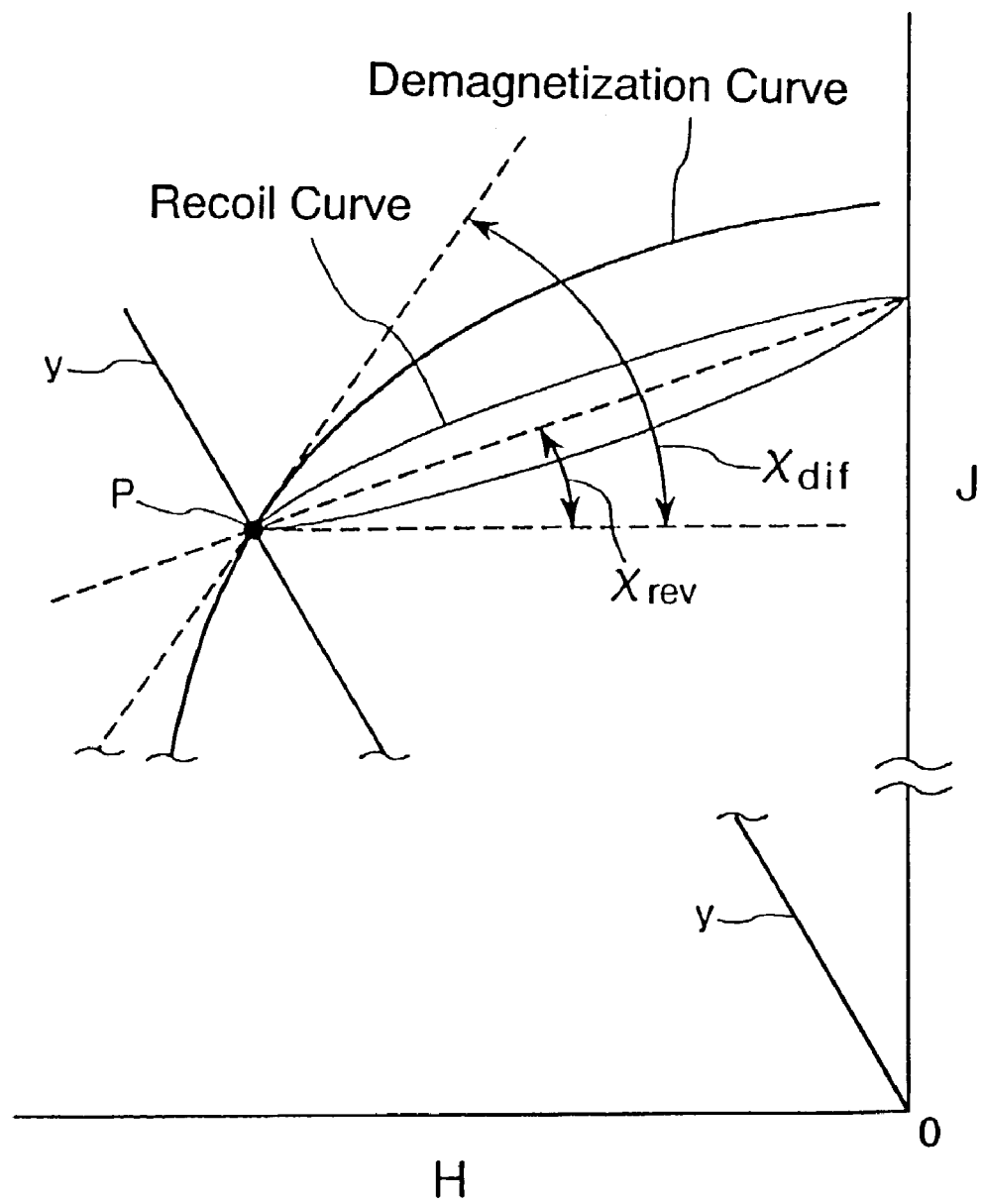
FIG. 6 is a J-H diagram (coordinate) for explaining the irreversible susceptibility.

As shown in FIG. 6, the irreversible susceptibility ($\chi$irr) is the parameter which is represented by the following formula (unit is Henry/m, which is represented by H/m in this specification), wherein a gradient of a tangential line of the demagnetization curve at a certain point P on the demagnetization curve in the J-H diagram is defined by differential susceptibility ($\chi$dif) and a gradient of a recoil curve when the recoil curve from the point P is drawn with the demagnetization field being once reduced (that is, a gradient connecting the both ends of the recoil curve) is defined by reversible susceptibility($\chi$rev).

Irreversible Susceptibility($\chi$irr)=differential susceptibility($\chi$dif)−reversible susceptibility($\chi$rev).

In this connection, it is to be noted that in the present invention, the point P is defined as an intersectioning point of the demagnetization curve and the straight line y which passes the origin in the J-H diagram and has a gradient (J/H) of $-3.8 \times 10^{-6}$ H/m.

The reason why the upper limit value of the irreversible susceptibility ($\chi_{irr}$) at the room temperature is defined as $5.0 \times 10^{-7}$ H/m is as follows.

As stated in the above, the irreversible susceptibility ($\chi$irr) represents the changing ratio of the magnetization, which is not returned even if the absolute value thereof is reduced once after demagnetization is applied, with respect to the magnetic field. Accordingly, by restraining the irreversible susceptibility ($\chi$irr) to a relatively small value, it is possible to improve heat stability of the bonded magnet and especially to reduce the absolute value of the irreversible flux loss. Actually, within the range of the irreversible susceptibility ($\chi$irr) of the present invention, the irreversible flux loss obtained when the bonded magnet is being left in the atmosphere of 100° C. for one hour and then the temperature is lowered into room temperature is equal to or less than 5% in its absolute value, which means that practically satisfactory heat resisting property (in particular when used in motors or the like), that is heat stability can be obtained.

In contrast, when the irreversible susceptibility ($\chi$irr) exceeds $5.0 \times 10-7$ H/m, the absolute value of the irreversible flux loss is increased, so that it is not possible to obtain satisfactory heat stability. Further, since the intrinsic coercive force (HCJ) is lowered and the rectangularity thereof becomes poor, use of the obtained bonded magnet is limited to the case where the permeance coefficient (Pc) becomes large (e.g. Pc$\geq$5). Furthermore, the lowered coercive force reduces the heat stability.

The reason why the irreversible susceptibility ($\chi$irr) at the room temperature is defined as $5.0 \times 10-7$ H/m is described above. However, it is preferred that the value of the irreversible susceptibility ($\chi$irr) is as smaller as possible. Therefore, in the present invention, it is preferable that the irreversible susceptibility ($\chi$irr) is equal to or less than $4.5 \times 10-7$ H/m, and it is more preferable that the irreversible susceptibility ($\chi$irr) is equal to or less than $4.0 \times 10-7$ H/m.

It is preferred that the intrinsic coercive force (HCJ) of the bonded magnet at room temperature is 406 to 717 kA/m, and 435 to 677 kA/m is more preferable.

If the intrinsic coercive force (HCJ) exceeds the above upper limit value, magnetizability is deteriorated. On the other hand, if the intrinsic coercive force (HCJ) is lower than the lower limit value, demagnetization occurs conspicuously when a reverse magnetic field is applied depending upon the usage of the motor and the heat resisting property at a high temperature is deteriorated. Therefore, by setting the intrinsic coercive force (HCJ) to the above range, in the case where the bonded magnet (cylindrical magnet in particular) is subjected to multipolar magnetization, a satisfactory magnetization can be accomplished even when a sufficiently high magnetizing field cannot be secured, which makes it possible to obtain a sufficient magnetic flux density, and to provide a high performance bonded magnet, especially a bonded magnet for motor.

The maximum magnetic energy product $(BH)_{max}$ of the bonded magnet of the present invention is not particularly limited to the specific value. However, in the present invention, 87 to 125 kJ/m$^3$ is preferable and 100 to 125 kJ/m$^3$ is more preferable.

EXAMPLES

Example 1

Magnetic powders with alloy compositions $Nd_{8.7}Fe_{77.2-w}Co_{8.5}B_{5.6}Al_w$ (that is, various types of magnetic powders in which the content w of Al is changed variously) were obtained by the method described below.

First, each of the materials Nd, Fe, Co, B, and Al was weighed to cast a mother alloy ingot, and a sample of about 15 g was cut out from the ingot.

A quenched ribbon manufacturing apparatus 1 as shown in FIG. 4 and FIG. 5 was prepared, and the sample was placed in a quartz tube 2 having a nozzle (circular orifice) 3 at the bottom. After evacuating the interior of a chamber in which the quenched ribbon manufacturing apparatus 1 is housed, an inert gas (Ar gas and helium gas) was introduced to obtain an atmosphere with desired temperature and pressure.

Then, the ingot sample in the quartz tube 2 was melted by high frequency induction heating, the circumferential velocity and the jetting pressure (difference between the inner pressure of the quartz tube 2 and the pressure of the atmosphere) were adjusted to 20 m/s and 40 kPa, respectively. Under the state, the molten metal was jetted against the circumferential surface 53 of the cooling roll 5, to obtain a quenched ribbon (average thickness of about 30 μm, and average width of about 1.6 mm).

The quenched ribbon was then coarsely crushed, and the powder was subjected to a heat treatment in an argon atmosphere at 680° C. for 300 sec. In this way, the various types of magnetic powders each having different contents w of Al were obtained.

To analyze the phase structure of the obtained magnetic powders, the respective magnetic powder was subjected to X-ray diffraction using Cu-K$\alpha$ line at the diffraction angle of 20–60°. From the thus obtained diffraction pattern, the presence of diffracted peaks of a hard magnetic phase, $Nd_2(Fe.Co)_{14}B_1$ phase, and a soft magnetic phase, $\alpha$—(Fe, Co) phase, were confirmed. Further, from the observation result using a transmission electron microscope (TEM), the formation of a nanocomposite structure was confirmed in each magnetic powder.

Next, in order to adjust the grain size of the respective magnetic powders, each magnetic powder was ground by a granulator in an argon gas atmosphere to obtain magnetic powder having average grain size of 60 μm.

A composite (compound) for bonded magnet was prepared by mixing the respective magnetic powder with an epoxy resin and a small amount of hydrazine antioxidant and then kneading them.

Then, each of the thus obtained compounds was crushed to be granular. Then, the granular substance was weighed and filled into a die of a press machine, and a molded body was obtained by compression molding (in the absence of a magnetic field) the sample at a pressure of 7 ton/cm2.

After releasing from the die, the epoxy resin was cured by heating at a temperature of 150° C. (that is subjected to cure treatment) and a columnar isotropic bonded magnet with diameter 10 mm $\phi$ and height 7 mm was obtained. The content of the magnetic powder in the respective bonded magnets was 97.0 wt % and the magnetic density of the respective bonded magnets was about 6.21 Mg/m3.

After pulse magnetization is performed for the respective bonded magnets under the magnetic field strength of 3.2 MA/m, magnetic characteristics (remanent magnetic flux density Br, intrinsic coercive force (HCJ), and maximum magnetic energy product (BH)max) were measured using a DC recording fluxmeter under the maximum applied magnetic field of 2.0 MA/m. The temperature at the measurement was 23° C. (that is, room temperature).

Figure 7:
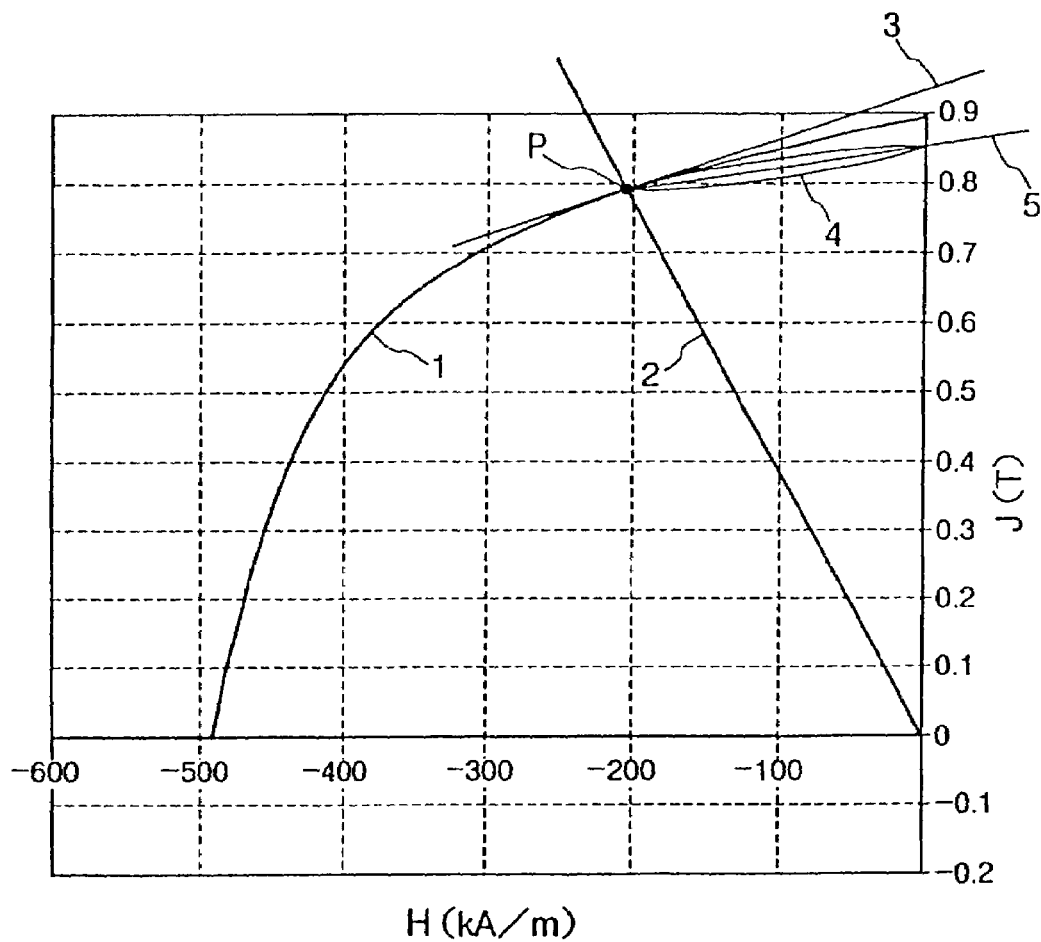
FIG. 7 is a J-H diagram (coordinate) that represents demagnetization curves and recoil curves.

As shown in FIG. 7, in the measured demagnetization curve of J-H diagram, a recoil curve having a starting point P at an intersectioning point P between the demagnetization curve and a straight line which passes an origin and has a gradient of $-3.8 \times 10-6$ H/m was produced with the magnetic field being once changed to zero and then being returned the original state, and then the gradient of the recoil curve (that is, the gradient of the straight line connecting the both ends of the recoil curve) was obtained and then it was defined as the reversible susceptibility ($\chi$rev). Further, the gradient of a tangential line of the demagnetization curve at the intersectioning point P was obtained and then it was defined as the differential susceptibility (χdif). The irreversible susceptibility (χirr) was obtained by the formula of χirr=χdif−χrev. The results of them are shown in FIG. 8 at Table 1.

Next, the heat resisting property (heat stability) of the respective bonded magnets (each having the column shape having diameter of 10 mm and height of 7 mm) was examined. The heat resisting property was obtained by measuring the irreversible flux loss (ratio of flux loss) obtained when the bonded magnet was being left in the atmosphere of 100° C. for one hour and then the temperature was lowered to the room temperature, and then it was evaluated. The results thereof are shown in the attached Table 1. In this connection, it is to be noted that smaller absolute value of the irreversible flux loss (ratio of flux loss) means more excellent heat resisting property (heat stability).

Next, in order to evaluate the magnetizability of the respective bonded magnets (each having the column shape having diameter of 10 mm and height of 7 mm), the magnetizability thereof was measured by changing the magnetized magnetic field variously. In this connection, the ratio of magnetization was represented using the ratio with respect to the remanent magnetic flux under the magnetized magnetic filed of 4.8 MA/m, where the remanent magnetic flux is represented by 100%. The size of the magnetized magnetic filed of each of the bonded magnets when the ratio of magnetization is 90% was shown in the attached Table 1. In this Table, smaller value means more excellent magnetizability.

As seen from the attached Table 1, the isotropic bonded magnets formed of the magnetic powders in which the content w of Al is 0.02 to 1.5 at % and the irreversible susceptibility (χirr) is equal to or less than 5.0×10−7 H/m exhibit excellent magnetic characteristics (remanent magnetic flux density, intrinsic coercive force and maximum magnetic energy product) and have small absolute value of the irreversible susceptibility ($\chi_{irr}$), so that the heat resisting property of these magnets is high and the magnetizability thereof is excellent.

In contrast, the isotropic bonded magnets of the comparative examples which were composed from magnetic powders containing no Al or containing 2.0 at % of Al (more than the upper limit of the present invention) have poor magnetic characteristics. Further, the absolute value of the irreversible flux loss is large and the heat stability is low.

As described above, according to the present invention, it is possible to obtain bonded magnets having high performance and high reliability (especially, heat resisting property). In particular, these characteristics are exhibited when the bonded magnets are used in motors.

Example 2

Quenched ribbons of which alloy compositions were $(Nd_{1-y}Pr_y)_{8.8}Fe_{bal}Co_{7.5}B_{5.8}Al_{0.7}$ (that is, various types of quenched ribbons in which the substitution amount y of Pr is changed variously) were manufactured in the same manner as Example 1, and then the manufactured quenched ribbons were subjected to heat treatment in the argon gas atmosphere at a temperature of 680° C. for 10 minutes. Using the same analyzing method as that used in Example 1, it has been confirmed that the structure of each of the quenched ribbons constitutes a nanocomposite structure.

Next, in the same manner as Example 1, magnetic powders were obtained from the respective quenched ribbons, and then cylindrical (ring-shaped) isotropic bonded magnets having outer diameter of 20 mm, inner diameter of 18 mm and height of 7 mm were manufactured. The content of the magnetic powder in each of the bonded magnets was about 96.8 wt %. Further, the density of each of the bonded magnets was about 6.18 Mg/m³.

For these magnetic powders, magnetic characteristics (remanent magnetic flux density Br, intrinsic coercive force ($H_{CJ}$), and maximum magnetic energy product $(BH)_{max}$) and the irreversible susceptibility (X irr) were measured, and then they were evaluated. The results thereof are shown in FIG. 9 at Table 2.

Further, these bonded magnets were respectively subjected to multi-pole magnetization of 12 poles, and using each bonded magnet as a magnet for a rotor, a DC brush-less motor was assembled. Then, each of the DC motors was rotated at 4000 rpm to measure a back electromotive force generated in the coil winding thereof. As a result, it has been confirmed that a sufficiently high voltage could be obtained in each of the motors and these motors have a high performance.

Next, bonded magnets same as those of Example 1 were manufactured excepting that the various types of the magnetic powder having the different substitution ratio y of Pr described above are used.

The heat resisting property (heat stability) and the magnetizability of each of the thus manufactured bonded magnets was measured in the same way as Example 1, and the measurement results thereof were evaluated. The results thereof are shown in the attached Table 2.

As seen from the attached Table 2, each of the isotropic bonded magnets has excellent magnetic characteristics (remanent magnetic flux density Br, intrinsic coercive force (HCJ), and maximum magnetic energy product (BH)max) and the absolute value of the irreversible flux loss thereof is small, so that the heat resisting property (heat stability) is high and the magnetizability thereof is excellent. In particular, it is understood that the intrinsic coercive force and the maximum magnetic energy product (rectangularity) are improved while the excellent heat resisting property and magnetizability are maintained, by substituting a part of Nd with a predetermined amount of Pr (that is, an amount equal to or less than 75% with respect to the whole amount of R).

As stated in the above, according to the present invention, it is possible to provide bonded magnets having high performance and high reliability (especially, heat resisting property). In particular, these characteristics are exhibited when these bonded magnets are used in motors.

Example 3

Quenched ribbons of which alloy compositions were $((Nd_{0.5}Pr_{0.5}))_zDy_{1-z})_{9.0}Fe_{bal}Co_{7.7}B_{5.6}Al_{0.5}$ (that is, various types of quenched ribbons in which the substitution amount (1-z) of Dy is changed variously) were manufactured in the same manner as Example 1, and then the manufactured quenched ribbons were subjected to heat treatment in the argon gas atmosphere at a temperature of 680° C. for 12 minutes. Using the same analyzing method as that used in Example 1, it has been confirmed that the structure of each of the quenched ribbons constitutes a nanocomposite structure.

Next, in the same manner as Example 1, magnetic powders were obtained from the respective quenched ribbons, and then cylindrical (ring-shaped) isotropic bonded magnets having outer diameter of 20 mm, inner diameter of 18 mm and height of 7 mm were manufactured. The content of the magnetic powder in each of the bonded magnets was about 96.8 wt %. Further, the density of each of the bonded magnets was about 6.20 Mg/m³.

For these magnetic powders, magnetic characteristics (remanent magnetic flux density Br, intrinsic coercive force ($H_{CJ}$), and maximum magnetic energy product $(BH)_{max}$) and the irreversible susceptibility ($\chi_{irr}$) were measured, and then they were evaluated. The results thereof are shown in FIG. 10 at Table 3.

Further, these bonded magnets were respectively subjected to multi-pole magnetization of 12 poles, and using each bonded magnet as a magnet for a rotor, a DC brush-less motor was assembled. Then, each of the DC motors was rotated at 4000 rpm to measure a back electromotive force generated in the coil winding thereof. As a result, it has been confirmed that a sufficiently high voltage can be obtained in each of the motors, and these motors have a high performance.

Next, bonded magnets same as those of Example 1 were manufactured excepting that the various types of the magnetic powder having the different substitution ratio 1-z of Dy described above are used.

The heat resisting property (heat stability) and the magnetizability of each of the thus manufactured bonded magnets were measured in the same way as Example 1, and the measurement results thereof were evaluated. The results thereof are shown in the attached Table 3.

As seen from the attached Table 3, each of the isotropic bonded magnets has excellent magnetic characteristics (remanent magnetic flux density Br, intrinsic coercive force ($H_{CJ}$), and maximum magnetic energy product $(BH)_{max}$) and the absolute value of the irreversible flux loss thereof is small, so that the heat resisting property (heat stability) is high and the magnetizability thereof is excellent. In particular, it is understood that the intrinsic coercive force and the maximum magnetic energy product (rectangularity) were improved while the excellent heat resisting property and magnetizability are maintained, by adding a predetermined amount of Dy (equal to or less than 14% with respect to the whole amount of R).

As stated in(3) the above, according to the present invention, it is possible to provide bonded magnets having high performance and high reliability (especially, heat resisting property). In particular, these characteristics are exhibited when these bonded magnets are used in motors.

Example 4

Quenched ribbons of which alloy compositions were $Nd_{5.3}Pr_{2.8}Dy_{0.6}Fe_{76.8-v}Co_{8.5}B_{5.6}Al_{0.4}Si_v$ (that is, various types of quenched ribbons in which the content v of Si is changed variously) were manufactured in the same manner as Example 1, and then the manufactured quenched ribbons were subjected to heat treatment in the argon gas atmosphere at a temperature of 670° C. for 8 minutes. Using the same analyzing method as that used in Example 1, it has been confirmed that the structure of each of the quenched ribbons constitutes a nanocomposite structure.

Next, in the same manner as Example 1, magnetic powders were obtained from the respective quenched ribbons, and then cylindrical (ring-shaped) isotropic bonded magnets having outer diameter of 20 mm, inner diameter of 18 mm and height of 7 mm were manufactured using the magnetic powders. The content of the magnetic powder in each of the bonded magnets was about 96.9 wt %. Further, the density of each of the bonded magnets was about 6.19 $Mg/m^3$.

For these magnetic powders, magnetic characteristics (remanent magnetic flux density Br, intrinsic coercive force ($H_{CJ}$), and maximum magnetic energy product $(BH)_{max}$) and the irreversible susceptibility ($\chi_{irr}$) were measured, and then they were evaluated. The results thereof are shown in FIG. 11 at Table 4.

Further, these bonded magnets were respectively subjected to multi-pole magnetization of 12 poles, and using each bonded magnet as a magnet for a rotor, a DC brush-less motor was assembled. Then, each of the DC motors was rotated at 4000 rpm to measure a back electromotive force generated in the coil winding thereof. As a result, it has been confirmed that a sufficiently high voltage can be obtained in each of the motors, and these motors have a high performance.

Next, bonded magnets same as those of Example 1 were manufactured excepting that various types of the magnetic powder having the different content v of Si are used.

The heat resisting property (heat stability) and the magnetizability of each of the bonded magnets were measured in the same way as Example 1. Further, using the method described below, the heat resisting property (heat stability) and the magnetizability thereof were measured, and evaluated. The results thereof are shown in the attached Table 4.

The corrosion resistance property of the respective bonded magnet was evaluated by a dewing test (dew formation test). This rust examination was carried out by alternately placing each of the magnetic powders in the atmosphere at a temperature of 30° C. and a RH of 50% for 15 minutes or in the atmosphere at a temperature of 80° C. and a RH of 95% RH for fifteen minutes, and this was repeated for 24 times. Thereafter, the surface of each magnet was observed by a microscope and the degree of the generation of the rust was evaluated from the viewpoints of the following four steps.

A: no rust was generated
B: a very small amount of rust was generated
C: rust was generated
D: rust was remarkably generated The bonded magnets (ten bonded magnets for each) were immersed into a bath containing water at a temperature of 60° C. and a RH of 95%, and then the average time required until any rust is generated in each of the bonded magnets was examined. The results thereof were evaluated from the viewpoints of the following four steps.

A: no rust was generated after 500 hours was past
B: rust was generated between 400 hours and 500 hours
C: rust was generated between 300 hours and 400 hours
D: rust was generated within 300 hours As seen from the attached Table 4, each of the isotropic bonded magnets exhibits excellent magnetic characteristics (remanent magnetic flux density, intrinsic coercive force and maximum magnetic energy product) and heat resisting property (heat stability), and the magnetizability of the respective magnets is good.

In particular, the bonded magnets composed from the magnetic powder in which a predetermined amount of Si (0.1 to 3 at %) is contained have an improved corrosion resistance property in the magnetic powder itself as well as the bonded magnet formed therefrom as compared with the bonded magnets containing no Si. Therefore, it is possible to omit or simplify corrosion preventing treatment such as application of anti-corrosion coating on the surfaces of the bonded magnets when they are actually used.

As described above, according to the present invention, it is possible to provide bonded magnets having high performance and high reliability (especially, high heat resisting property and corrosion resistance property). In particular, when these bonded magnets are used in motors, high performance can be exhibited.

Example 5

Isotropic bonded magnets were manufactured in the same manner as that used in Examples 1–4 excepting that the bonded magnets were produced using the extrusion molding. In this regard, it is to be noted that polyamide (Nylon 610) was used in the respective bonded magnets as a binder. Further, the content of the magnetic powder in the respective bonded magnets was about 95.5 wt % and the magnetic density thereof was about 5.85 Mg/m3.

For each of these bonded magnets, the above described measurement and evaluation were carried out (including the evaluation for corrosion resistance property). As a result, it has been confirmed that the same results as those of the Examples 1 to 4 were obtained. In particular, corrosion resistance property thereof was excellent.

Example 6

Isotropic bonded magnets of the present invention were manufactured in the same manner as that used in Examples 1–4 excepting that the bonded magnets were produced using the injection molding. In this regard, it is to be noted that poly phenylene sulfide was used in the respective bonded magnets as a binder. Further, the content of the magnetic powder in the respective bonded magnets was about 94.1 wt % and the magnetic density thereof was about 5.63 Mg/m3.

For each of these bonded magnets, the above described measurement and evaluation were carried out (including the evaluation for corrosion resistance). As a result, it has been confirmed that the same results as those of the Examples 1 to 4 were obtained. In particular, corrosion resistance property thereof was excellent.

As described above, according to the present invention, the following effects can be obtained.

Since each of the magnetic powders has the composite structure having a soft magnetic phase and a hard magnetic phase and contains a predetermined amount of Al, they have high magnetizability and exhibit excellent magnetic characteristics so that intrinsic coercive force and rectangularity thereof are especially improved.

The absolute value of the irreversible flux loss is small and excellent heat resisting property (heat stability) can be obtained.

Because of the high magnetic flux density that can be secured by this invention, it is possible to obtain a bonded magnet with high magnetic performance even if it is isotropic. In particular, since magnetic performance equivalent to or better than the conventional isotropic bonded magnet can be obtained with a magnet of smaller volume as compared with the conventional isotropic bonded magnet, it is possible to provide a high performance motor of a smaller size.

Moreover, since a higher magnetic flux density can be secured, in manufacturing a bonded magnet sufficiently high magnetic performance is obtainable without pursuing any means for elevating the density of the bonded magnet. As a result, the dimensional accuracy, mechanical strength, corrosion resistance, heat resisting property (heat stability) and the like can be improved in addition to the improvement in the moldability, so that it is possible to readily manufacture a bonded magnet with high reliability. In particular, when Si is contained therein, further improved corrosion resistance can be obtained.

Since the magnetizability of the magnet according to this invention is excellent, it is possible to magnetize a magnet with a lower magnetizing field. In particular, multipolar magnetization or the like can be accomplished easily and surely, and further a high magnetic flux density can be obtained.

Since a high density is not required to the bonded magnet, the present invention is adapted to the manufacturing method such as the extrusion molding method or the injection molding method by which molding at high density is difficult as compared with the compression molding method, and the effects described in the above can also be realized in the bonded magnet manufactured by these molding methods. Accordingly, various molding methods can be selectively used and thereby the degree of selection of shaped for the bonded magnet can be expanded.

Finally, it is to be understood that the present invention is not limited to Examples described above, and many changes or additions may be made without departing from the scope of the invention which is determined by the following claims.

What is claimed is:

1. An isotropic rare-earth bonded magnet comprising:
   a magnetic powder having an alloy composition represented by $Rx(Fe_{1-y}Co_y)_{100-x-z-w}B_zAl_w$ (where R is at least one rare-earth element, x is 8.1–9.4 at %, y is 0.0–0.30 at %, z is 4.6–6.8 at %, and w is 0.02–1.5 at %), the magnetic powder being constituted from a composite structure having a soft magnetic phase and hard magnetic phase; and
   a binding resin;
   wherein the soft magnetic phase and the hard magnetic phase have a mean crystal grain size in the range of 1–100 nm; and
   the isotropic rare-earth bonded magnet is characterized in that the irreversible susceptibility ($\chi_{irr}$), which is measured by using an intersectioning point of a demagnetization curve in a J-H diagram representing magnetic characteristics at room temperature and a straight line which passes an origin in the J-H diagram and has a gradient (J/H) of $-3.8\times10^{-6}$ H/m as a starting point is less than $5.0\times10^{-7}$ H/m, and the intrinsic coercive force ($H_{CJ}$) of the magnet at the room temperature is in the range of 406–717 kA/m.

2. The isotropic bonded magnet as claimed in claim 1, wherein the magnetic powder includes at least one element which is selected from the group comprising Cu, Si, Ga, Ti, V, Ta, Zr, Nb, Mo, Hf, Ag, Zn, P, Ge and Cr.

3. The isotropic bonded magnet as claimed in claim 2, wherein the content of the element is equal or less than 3 at %.

4. The isotropic bonded magnet as claimed in claim 1, wherein the isotropic bonded magnet is to be subjected to multipolar magnetization or is already subjected to multipolar magnetization.

5. A motor comprising the isotropic bonded magnet according to claim 1.

* * * * *